Patented Nov. 19, 1946

2,411,236

UNITED STATES PATENT OFFICE 2,411,236

METHOD OF CONVERTING HYDROCARBONS INTO ORGANIC SULPHUR COMPOUNDS

Carlisle M. Thacker, Highland Park, Ill., assignor to The Pure Oil Company, Chicago, Ill., a corporation of Ohio No Drawing. Application March 30, 1940, Serial No. 326,963

7 Claims. (Cl. 23—206)

This invention relates to a method of converting hydrocarbons, particularly low boiling paraffinic hydrocarbons, to organic sulfur compounds, especially carbon-sulfur compounds.

This application is a continuation in part of co-pending application Serial No. 177,411, filed December 1, 1937.

An object of this invention is to convert hydrocarbons into organic sulfur compounds.

Another object of this invention is to convert low boiling paraffinic hydrocarbons into carbon-sulfur compounds.

A further object of this invention is to catalytically convert hydrocarbons into carbon-sulfur compounds at such temperatures as to afford a minimum of corrosion to the apparatus in which the process is conducted.

Other objects of the invention will become apparent from the following description.

It has been discovered that hydrocarbons can be reacted with sulfur, selenium and sulfur or selenium yielding compounds at elevated temperatures in the presence of a suitable catalyst to form organic sulfur compounds such as carbon-sulfur compounds and including alkyl sulfur compounds. As examples of such compounds may be mentioned carbon disulfide and methyl, ethyl, propyl and butyl mercaptans.

In carrying out the invention, substantially pure hydrocarbons such as methane, ethane, propane or butane or mixtures thereof or other hydrocarbons may be used as starting materials. For example, when the starting material is a hydrocarbon gas such as methane, the methane is heated and mixed with sulfur vapors and the mixture fed into a reactor where the mixed gas and sulfur vapor is contacted with appropriate catalyst. As catalysts suitable for effecting the conversion of hydrocarbons to organic sulfur compounds may be mentioned oxides or sulfides of vanadium, manganese, copper, iron, cobalt, nickel, chromium and molybdenum. The sulfides of these metals are generally preferred. These compounds may be used alone or supported on materials such as silica gel, alumina gel, pumice or charcoal, etc., which of themselves may possess catalytic activity. The reactants are preferably contacted at temperatures of approximately 400–700° C. and under pressures of approximately 1 to 125 atmospheres. While good yields may be obtained under a relatively large number of satisfactory operating conditions of temperature and pressure within the desired range, those conditions are preferred which maintain the reactants in the vapor phase. Elevated pressures influence the reactions in the desired direction. Typical reactions which may take place between a normally gaseous paraffinic hydrocarbon such as methane and sulfur are as follows:

1. $CH_4 + 1/2 S_2 \rightarrow CH_3SH$
2. $2CH_4 + S_2 \rightarrow (CH_3)_2S + H_2S$
3. $2CH_4 + 3/2 S_2 \rightarrow (CH_3)S_2 + H_2S$
4. $CH_4 + S_2 \rightarrow CS_2 + 2H_2$
5. $CH_4 + 2S_2 \rightarrow CS_2 + 2H_2S$ The amount of sulfur charged with the hydrocarbon may be varied between rather wide limits depending upon a number of factors among which are time of residence of the reactants in the reaction zone, particular products desired and reaction temperature and pressure. Where intermediate sulfur oxidation products are desired the sulfur should not be in excess of that necessary to react with the hydrocarbons to form mercaptans. In general the amount of sulfur charged with the gas is preferably not in excess of that necessary to stoichiometrically react with the hydrocarbon to form the desired organic sulfur compound. By controlling the proportion of sulfur within this range, maximum yields of desirable reaction products may be obtained. The reactor as well as the remainder of the apparatus may be fabricated from ordinary iron, although stainless steel, chromium steel, molybdenum steel, silica, quartz or other materials which are resistant to sulfur corrosion or non-resistant steel lined with a refractory lining such as silica or quartz are preferred.

As shown by the foregoing equations, sulfur may react with hydrocarbon gas to form mercaptans, thio-ethers and organic disulfides such as dimethyl disulfide and carbon disulfide. The reaction products are cooled and the organic sulfur compounds separated therefrom by fractionation, absorption in a suitable solvent such as naphtha and subsequently separated therefrom by fractionation or by other suitable means. The particular method of separation of reaction products from unreacted materials will depend largely upon the composition of the reaction products. Any hydrogen sulfide present may be separated from organic sulfur compounds by conventional methods such as by scrubbing with water or aqueous alkali under appropriate conditions of temperature and concentration and prior to separation of the organic sulfur compounds from the remaining gases. Unreacted gases may be recycled for further reaction. Selenium may be substituted for sulfur when the reaction temperature is sufficiently high to vaporize selenium. As sources of sulfur, compounds thereof which readily yield free sulfur, may be used. The apparatus in which the process is carried out may be of any conventional type consisting of a heating means and reaction chamber with cooling and fractionating and/or other separating means connected to the reaction chamber.

In a specific example methane was mixed with sulfur in a ratio of 0.59 mol of methane to one mol of sulfur vapor, calculated as diatomic sulfur, and the mixture contacted with iron sulfide at a space velocity of 775 and at a temperature of 594° to 600° C. Space velocity may be defined as the ratio of the total volume of vapor charged per hour to the total volume of catalyst space. A liquid condensate was obtained, the major portion of which was carbon disulfide and which contained minor portions of intermediate sulfur oxidation products. In another run using the same catalyst, 0.55 mols of methane was mixed with one mol of sulfur vapor, calculated as diatomic sulfur, and the mixture contacted with the catalyst at a space velocity of 794 and a temperature of 594° C. to 598° C. A liquid condensate was obtained, the major portion of which was carbon disulfide and which contained minor portions of intermediate sulfur oxidation products. In another run at a temperature of 594° C. to 599° C. and using a proportion of 5.54 mols of methane to one mol of sulfur vapor, calculated as diatomic sulfur, the mixture was contacted at a space velocity of 806 with a catalyst consisting of manganese sulfide deposited on Activated alumina in a ratio of 1 to 20. A liquid product consisting principally of carbon disulfide and containing minor portions of intermediate sulfur oxidation products, was obtained. In all of the foregoing examples pressures slightly above atmospheric were employed.

It is not intended that the invention shall be limited by the foregoing specific examples which are presented for purpose of illustration, but that the invention shall be limited only by the scope of the claims.

What is claimed is:

1. The method of preparing carbon-sulfur compounds which comprises contacting paraffinic hydrocarbon gases with sufficient sulfur vapors to stoichiometrically react with the gases to form mercaptans at a temperature of at least 400° C., at which the sulfur and hydrocarbon gases chemically react, in the presence of a catalyst selected from the group of preformed metal sulfides.

2. Method in accordance with claim 1 in which the temperature is between approximately 400° and 700° C.

3. Method in accordance with claim 1 in which the catalyst is supported on a carrier selected from the group of silica gel, alumina gel, pumice and charcoal.

4. Method in accordance with claim 1 in which the catalyst is iron sulfide.

5. Method in accordance with claim 1 in which the catalyst is cobalt sulfide.

6. Method in accordance with claim 1 in which the catalyst is nickel sulfide.

7. Method in accordance with claim 1 in which the catalyst is a sulfide selected from the group consisting of vanadium, manganese, copper, iron, cobalt, nickel, chromium and molybdenum sulfides.

CARLISLE M. THACKER.